US011969998B2

(12) United States Patent
Linn et al.

(10) Patent No.: US 11,969,998 B2
(45) Date of Patent: Apr. 30, 2024

(54) MULTIPLE CIRCUITS COUPLED TO AN INTERFACE

(71) Applicant: HEWLETT-PACKARD DEVELOPMENT COMPANY, L.P., Spring, TX (US)

(72) Inventors: Scott A. Linn, Corvallis, OR (US); James Michael Gardner, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/962,736

(22) Filed: Oct. 10, 2022

(65) Prior Publication Data

US 2023/0034785 A1 Feb. 2, 2023

Related U.S. Application Data

(62) Division of application No. 16/956,326, filed as application No. PCT/US2019/016724 on Feb. 6, 2019, now Pat. No. 11,628,667.

(51) Int. Cl.
*B41J 2/045* (2006.01)

(52) U.S. Cl.
CPC ....... *B41J 2/04546* (2013.01); *B41J 2/04521* (2013.01); *B41J 2/04551* (2013.01); *B41J 2/04563* (2013.01)

(58) Field of Classification Search
CPC ................ B41J 2/04546; B41J 2/04521; B41J 2/14153; B41J 2/04563; B41J 2/04551; B41J 2/04541; B41J 2/0451
See application file for complete search history.

(56) References Cited

U.S. PATENT DOCUMENTS

| | | | |
|---|---|---|---|
| 5,942,900 | A | 8/1999 | Demeerleer et al. |
| 6,116,714 | A | 9/2000 | Imanaka et al. |
| 6,161,916 | A | 12/2000 | Gibson et al. |
| 6,705,694 | B1 | 3/2004 | Barbour et al. |
| 7,510,255 | B2 | 3/2009 | Tamura et al. |
| 7,802,858 | B2 | 9/2010 | Kasai |
| 7,874,631 | B2 | 1/2011 | Sheahan et al. |
| 8,888,226 | B1 | 11/2014 | Gardner et al. |
| 9,493,002 | B2 | 11/2016 | Edelen et al. |
| 2002/0024559 | A1 | 2/2002 | Murray et al. |
| 2004/0100519 | A1 | 5/2004 | Kikuchi et al. |
| 2004/0100559 | A1 | 5/2004 | Stacklies et al. |
| 2004/0125173 | A1 | 7/2004 | Parish et al. |
| 2010/0079553 | A1 | 4/2010 | Katoh |
| 2011/0221819 | A1 | 9/2011 | Omo |
| 2017/0348968 | A1 | 12/2017 | Anderson et al. |

(Continued)

FOREIGN PATENT DOCUMENTS

| | | | |
|---|---|---|---|
| AU | 2019428011 | B2 | 5/2023 |
| CN | 101617242 | A | 12/2009 |

(Continued)

*Primary Examiner* — Jannelle M Lebron
(74) *Attorney, Agent, or Firm* — Foley & Lardner LLP

(57) ABSTRACT

An integrated circuit to drive a plurality of fluid actuation devices includes an interface, a digital circuit, an analog circuit, and control logic. The digital circuit outputs a digital signal to the interface. The analog circuit outputs an analog signal to the interface. The control logic activates the digital circuit or the analog circuit.

13 Claims, 7 Drawing Sheets

(56) References Cited

U.S. PATENT DOCUMENTS

| | | | |
|---|---|---|---|
| 2018/0170051 | A1 | 6/2018 | Nomura et al. |
| 2019/0105908 | A1* | 4/2019 | Ogawa ................. B41J 2/04586 |
| 2021/0229432 | A1 | 7/2021 | Linn et al. |

FOREIGN PATENT DOCUMENTS

| | | | |
|---|---|---|---|
| CN | 102310649 | A | 1/2012 |
| CN | 103577626 | A | 2/2014 |
| CN | 104275939 | A | 1/2015 |
| CN | 204172495 | U | 2/2015 |
| EP | 1029685 | A2 | 8/2000 |
| EP | 3710256 | B1 | 6/2023 |

* cited by examiner

MULTIPLE CIRCUITS COUPLED TO AN INTERFACE

CROSS REFERENCE

This application is a Divisional of application Ser. No. 16/956,326, filed Jun. 19, 2020 entitled: MULTIPLE CIRCUITS COUPLED TO AN INTERFACE, which is 371 National Application of PCT/US2019/016724, filed Feb. 6, 2019, entitled MULTIPLE CIRCUITS COUPLED TO AN INTERFACE, both of which are incorporated herein.

BACKGROUND

An inkjet printing system, as one example of a fluid ejection system, may include a printhead, an ink supply which supplies liquid ink to the printhead, and an electronic controller which controls the printhead. The printhead, as one example of a fluid ejection device, ejects drops of ink through a plurality of nozzles or orifices and toward a print medium, such as a sheet of paper, so as to print onto the print medium. In some examples, the orifices are arranged in at least one column or array such that properly sequenced ejection of ink from the orifices causes characters or other images to be printed upon the print medium as the printhead and the print medium are moved relative to each other.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Fluid ejection dies, such as thermal inkjet (TIJ) dies may be narrow and long pieces of silicon. To minimize the total number of contact pads on a die, it is desirable for at least some of the contact pads to provide multiple functions. Accordingly, disclosed herein are integrated circuits (e.g., fluid ejection dies) including a multipurpose contact pad (e.g., sense pad) coupled to a memory, thermal sensors, internal test logic, a timer circuit, a crack detector, and/or other circuitry. The multipurpose contact pad receives signals from each of the circuits (e.g., one at a time), which may be read by printer logic. By using a single contact pad for multiple functions, the number of contact pads on the integrated circuit may be reduced. In addition, the printer logic coupled to the contact pad may be simplified.

As used herein a "logic high" signal is a logic "1" or "on" signal or a signal having a voltage about equal to the logic power supplied to an integrated circuit (e.g., between about 1.8 V and 15 V, such as 5.6 V). As used herein a "logic low" signal is a logic "0" or "off" signal or a signal having a voltage about equal to a logic power ground return for the logic power supplied to the integrated circuit (e.g., about 0 V).

Figure 1A:
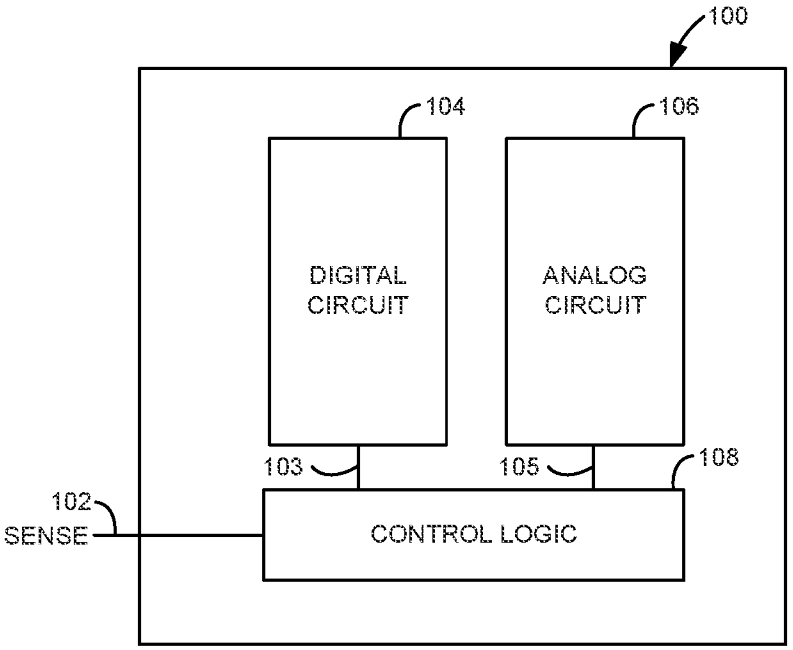
FIG. 1A is a block diagram illustrating one example of an integrated circuit to drive a plurality of fluid actuation devices.

FIG. 1A is a block diagram illustrating one example of an integrated circuit 100 to drive a plurality of fluid actuation devices. Integrated circuit 100 includes an interface (e.g., sense interface) 102, a digital circuit 104, an analog circuit 106, and control logic 108. Control logic 108 is electrically coupled to interface 102, to digital circuit 104 through a signal path 103, and to analog circuit 106 through a signal path 105. Interface 102 may include a contact pad, a pin, a bump, or a wire. In one example, interface 102 is configured to contact a single printer-side contact to transmit signals to and from the single printer-side contact, such as a single printer-side contact of fluid ejection system 700, which will be described below with reference to FIG. 7.

The digital circuit 104 outputs a digital signal to the interface 102 through control logic 108. In one example, the digital circuit 104 includes a memory. In another example, the digital circuit 104 includes a timer. In another example, the digital circuit 104 includes a configuration register. In yet another example, the digital circuit 104 includes a shift register.

The analog circuit 106 outputs an analog signal to the interface 102 through control logic 108. In one example, the analog circuit 106 includes a resistor wiring. The resistor wiring may be separate from and extend along at least a subset of fluid actuation devices (e.g. fluid actuation devices 608, which will be described below with reference to FIGS. 6A and 6B). In another example, the analog circuit 106 outputs an analog signal representative of a state of the integrated circuit 100, where the state includes at least one of a crack (e.g., sensed by a crack detector) and a temperature (e.g., sensed by a temperature or thermal sensor). In another example, the analog circuit 106 includes a crack detector. In yet another example, the analog circuit 106 includes a thermal sensor.

The control logic 108 activates the digital circuit 104 or the analog circuit 106 such that an output of the digital circuit 104 or the analog circuit 106 may be read through interface 102. In one example, control logic 108 activates the digital circuit 104 or the analog circuit 106 based on data passed to integrated circuit 100. Control logic 108 may include transistor switches, tristate buffers, and/or other suitable logic circuitry for controlling the operation of integrated circuit 100.

Figure 1B:
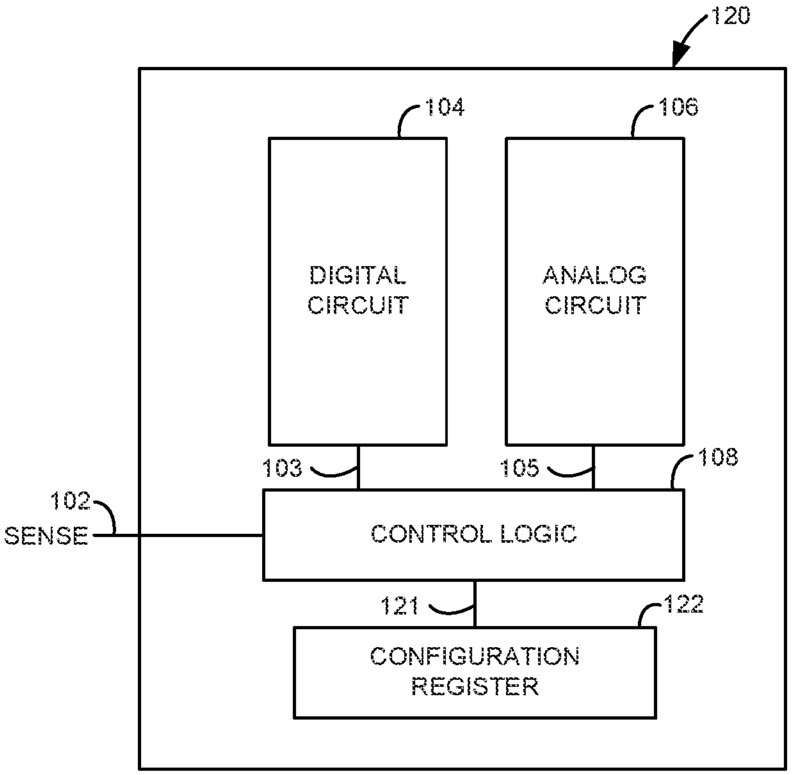
FIG. 1B is a block diagram illustrating another example of an integrated circuit to drive a plurality of fluid actuation devices.

FIG. 1B is a block diagram illustrating another example of an integrated circuit 120 to drive a plurality of fluid actuation devices. Integrated circuit 120 is similar to integrated circuit 100 previously described and illustrated with reference to FIG. 1A, except that integrated circuit 120 also includes a configuration register 122. Configuration register 122 is electrically coupled to control logic 108 through a signal path 121. Configuration register 122 may enable or disable the digital circuit 104 and enable or disable the analog circuit 106 based on data stored in the configuration register.

Configuration register 122 may be a memory device (e.g., non-volatile memory, shift register, etc.) and may include any suitable number of bits (e.g., 4 bits to 24 bits, such as 12 bits). In certain examples, configuration register 122 may also store configuration data for testing integrated circuit 120, detecting cracks within a substrate of integrated circuit 120, enabling timers of integrated circuit 120, setting analog delays of integrated circuit 120, validating operations of integrated circuit 120, or for configuring other functions of integrated circuit 120.

Figure 2A:
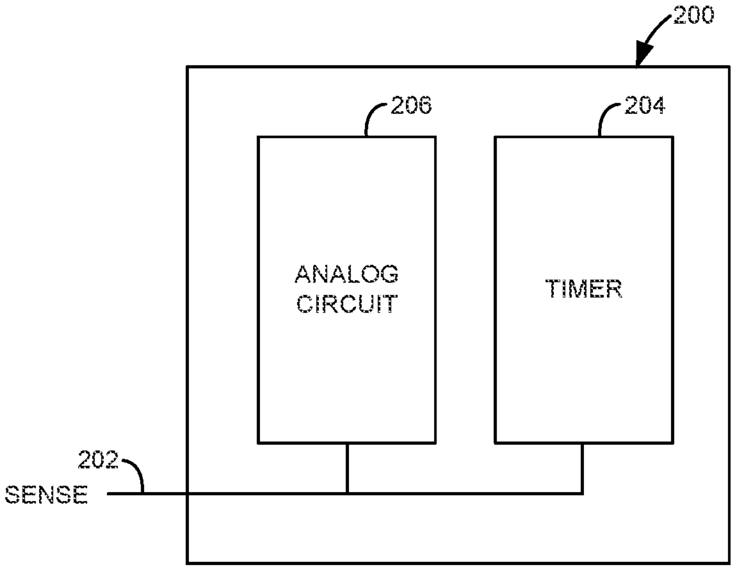
FIG. 2A is a block diagram illustrating another example of an integrated circuit to drive a plurality of fluid actuation devices.

FIG. 2A is a block diagram illustrating another example of an integrated circuit 200 to drive a plurality of fluid actuation devices. Integrated circuit 200 includes an interface (e.g., sense interface) 202, a timer 204, and an analog circuit 206. The interface 202 is electrically coupled to timer 204 and analog circuit 206. The analog circuit 206 outputs an analog signal to the interface 202. The timer 204 overrides the analog signal on the interface 202 from the analog circuit 206 in response to the timer elapsing. In one example, interface 202 and analog circuit 206 are similar to interface 102 and analog circuit 106 previously described and illustrated with reference to FIGS. 1A and 1B.

Figure 2B:
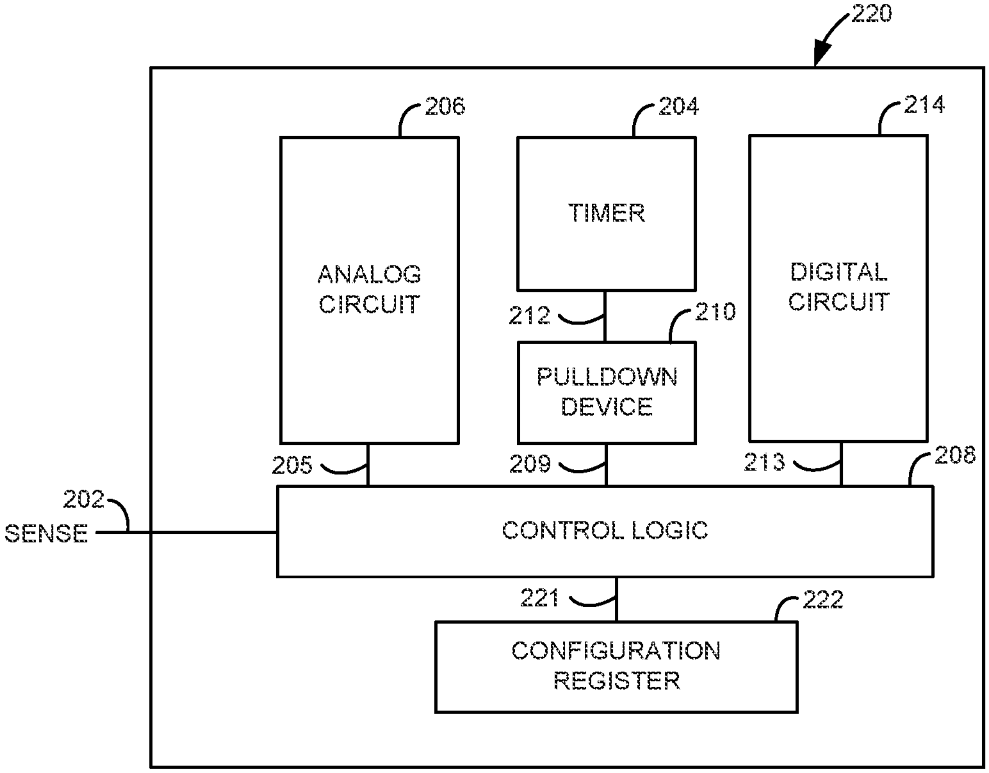
FIG. 2B is a block diagram illustrating another example of an integrated circuit to drive a plurality of fluid actuation devices.

FIG. 2B is a block diagram illustrating another example of an integrated circuit 220 to drive a plurality of fluid actuation devices. Integrated circuit 220 includes an interface 202, an analog circuit 206, and a timer 204. In addition, integrated circuit 220 includes control logic 208, a pulldown device 210, a digital circuit 214, and a configuration register 222. Control logic 208 is electrically coupled to sense interface 202, to analog circuit 206 through a signal path 205, to pulldown device 210 through a signal path 209, to digital circuit 214 through a signal path 213, and to configuration register 222 through a signal path 221. Pulldown device 210 is electrically coupled to timer 204 through a signal path 212.

The digital circuit 214 outputs a digital signal to the interface 202. In one example, the digital circuit 214 is similar to the digital circuit 104 previously described and illustrated with reference to FIGS. 1A and 1B. Control logic 208 activates the digital circuit 214 or the analog circuit 206. The timer 204 overrides the analog signal on the interface 202 from the analog circuit 206 or the digital signal on the interface 202 from the digital circuit 214 in response to the timer elapsing. In this example, timer 204 overrides the analog signal on the interface 202 from the analog circuit 206 or overrides the digital signal on the interface 202 from digital circuit 214 by activating the pulldown device 210. The pulldown device 210 pulls the interface 202 to a hard low (e.g., about 0 V or ground), which overrides any other signals on the interface 202. Configuration register 222 may enable or disable the analog circuit 206, enable or disable the digital circuit 214, and enable or disable the timer 204. In one example, configuration register 222 is similar to configuration register 122 previously described and illustrated with reference to FIG. 1B.

Figure 3A:
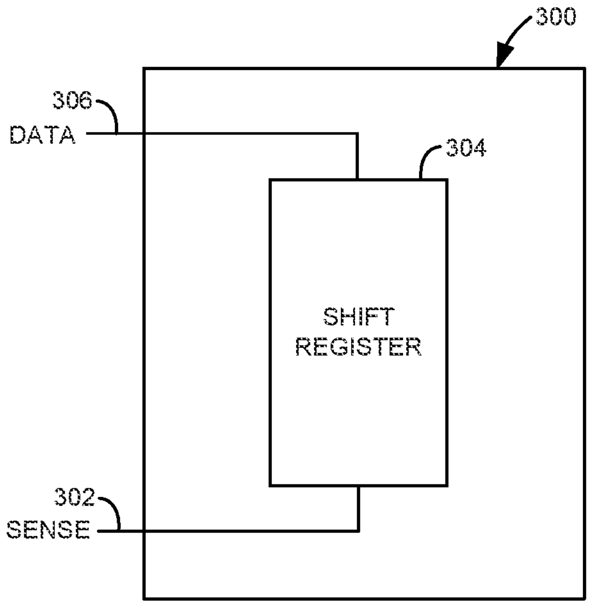
FIG. 3A is a block diagram illustrating another example of an integrated circuit to drive a plurality of fluid actuation devices.

FIG. 3A is a block diagram illustrating another example of an integrated circuit 300 to drive a plurality of fluid actuation devices. Integrated circuit 300 includes an output (e.g., sense) interface 302, a shift register 304, and a data interface 306. The shift register 304 shifts nozzle data into the integrated circuit 300 through the data interface 306 and shifts the nozzle data out of the integrated circuit 300 through the output interface 302. In this way, the shift register 304 may be tested to make sure the nozzle data input to integrated circuit 300 matches the nozzle data output of integrated circuit 300.

Figure 3B:
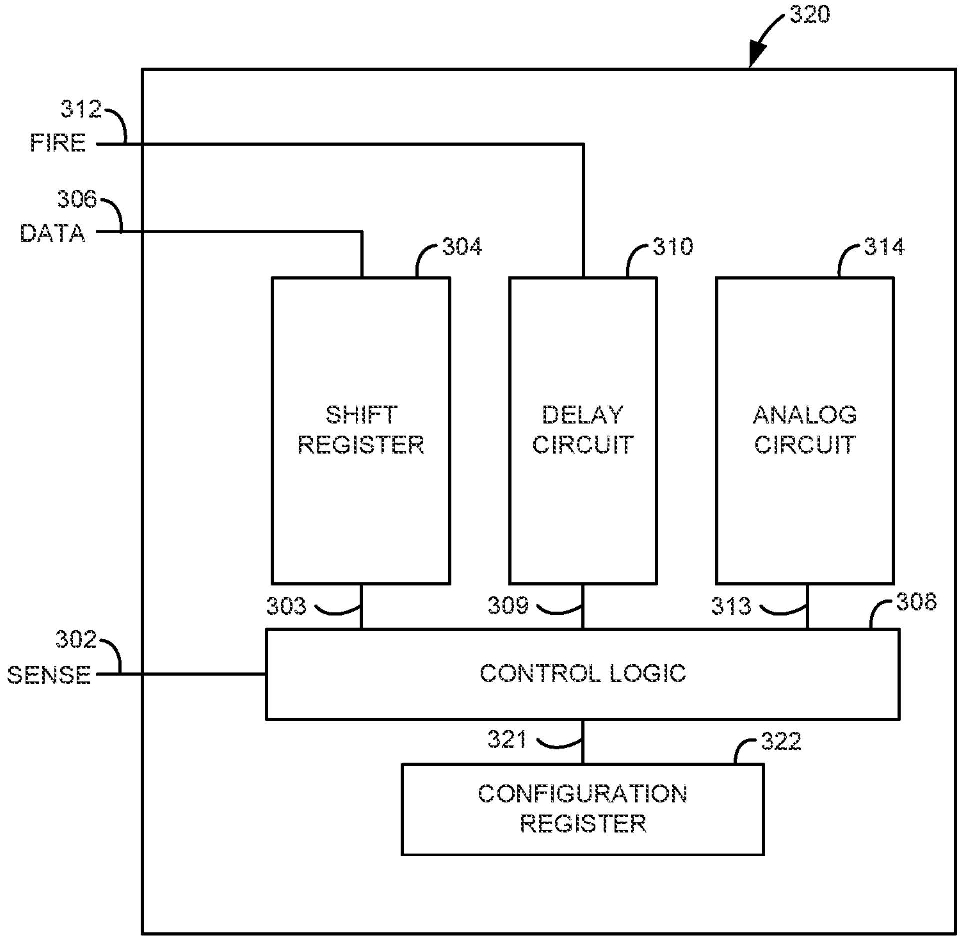
FIG. 3B is a block diagram illustrating another example of an integrated circuit to drive a plurality of fluid actuation devices.

FIG. 3B is a block diagram illustrating another example of an integrated circuit 320 to drive a plurality of fluid actuation devices. Integrated circuit 320 includes an output (e.g. sense) interface 302, a shift register 304, and a data interface 306. In addition, integrated circuit 320 includes control logic 308, a delay circuit 310, a fire interface 312, an analog circuit 314, and a configuration register 322. Control logic 308 is electrically coupled to output interface 302, to shift register 304 through a signal path 303, to delay circuit 310 through a signal path 309, to analog circuit 314 through a signal path 313, and to configuration register 322 through a signal path 321. Delay circuit 310 is electrically coupled to the fire interface 312.

The delay circuit 310 receives a fire signal through the fire interface 312 and outputs a delayed fire signal through the output interface 302. In this way, the delay circuit 310 may be tested to make sure the delay is functioning as expected. In one example, the configuration register 322 stores data to enable or disable the shifting of the nozzle data out of the integrated circuit 320 through the output interface 302. In another example, the configuration register 322 stores data to enable or disable the output of the delayed fire signal through the output interface 302. In yet another example, configuration register 322 stores data to enable or disable analog circuit 314. In one example, configuration register 322 is similar to configuration register 122 previously described and illustrated with reference to FIG. 1B.

Analog circuit 314 outputs an analog signal to the output interface 302. In one example, analog circuit 314 is similar to analog circuit 106 previously described and illustrated with reference to FIGS. 1A and 1B. Control logic 308 activates the analog circuit 314 to output an analog signal to the output interface 302, the shift register 304 to shift the nozzle data out of the integrated circuit 320 through the output interface 302, or activates the delay circuit 310 to receive a fire signal through the fire interface 312 and output a delayed fire signal through the output interface 302.

The output interface 302, the data interface 306, and the fire interface 312 may each include a contact pad, a pin, a bump, or a wire. In one example, each of the output interface 302, the data interface 306, and the fire interface 312 is configured to contact a corresponding printer-side contact to transmit signals to and from the printer-side contacts.

Figure 4:
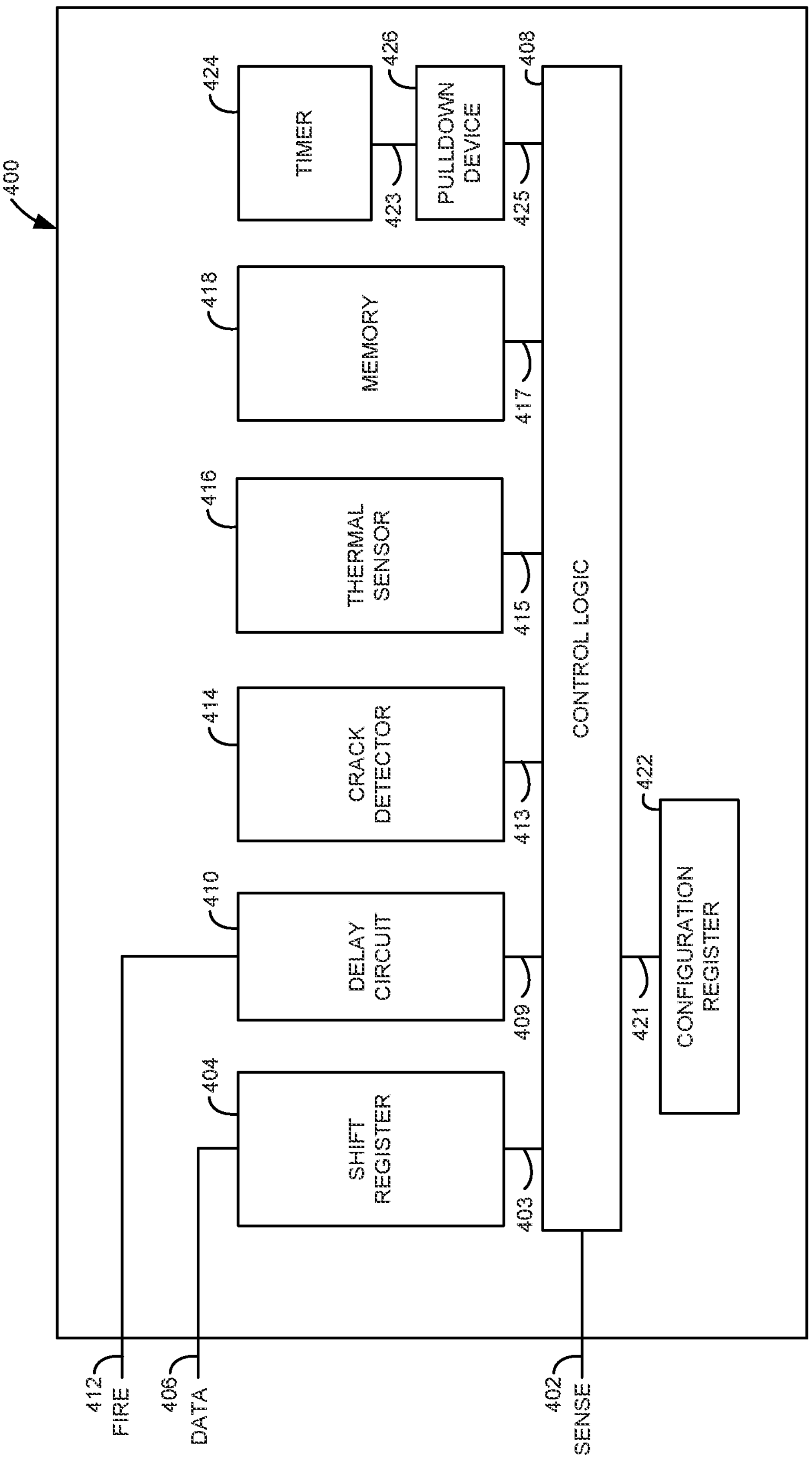
FIG. 4 is a block diagram illustrating another example of an integrated circuit to drive a plurality of fluid actuation devices.

FIG. 4 is a block diagram illustrating another example of an integrated circuit 400 to drive a plurality of fluid actuation devices. Integrated circuit 400 includes a sense interface 402, a shift register 404, a data interface 406, control logic 408, a delay circuit 410, a fire interface 412, a crack detector 414, a thermal sensor 416, a memory 418, a configuration register 422, a timer 424, and a pulldown device 426. Control logic 408 is electrically coupled to sense interface 402, to shift register 404 through a signal path 403, to delay circuit 410 through a signal path 409, to crack detector 414 through a signal path 413, to thermal sensor 416 through a signal path 415, to memory 418 through a signal path 417, to pulldown device 426 through a signal path 425, and to configuration register 422 through a signal path 421. Shift register 404 is electrically coupled to data interface 406. Delay circuit 410 is electrically coupled to fire interface 412. Pulldown device 426 is electrically coupled to timer 424 through a signal path 423.

Shift register 404 and delay circuit 410 are similar to shift register 304 and delay circuit 310 previously described and illustrated with reference to FIG. 3B. Timer 424 and pulldown device 426 are similar to timer 204 and pulldown device 210 previously described and illustrated with reference to FIG. 2B. Crack detector 414 outputs an analog signal to sense interface 402 indicating a crack state of integrated circuit 400. In one example, crack detector 414 includes a resistor wiring separate from and extending along at least a subset of fluid actuation devices (e.g., fluid actuation devices 608 of FIGS. 6A and 6B). Thermal sensor 416 outputs an analog signal to sense interface 402 indicating a temperature state of integrated circuit 400. In one example, thermal sensor 416 includes a thermal diode or another suitable device for sensing temperature. Memory 418 may store data for integrated circuit 400 or for a printer to which integrated circuit 400 is connected. Memory 418 may be read or written through sense interface 402.

Control logic 408 may enable or disable shift register 404, delay circuit 410, crack detector 414, thermal sensor 416, memory 418, and timer 424. In one example, control logic 408 may enable one of the shift register 404, delay circuit 410, crack detector 414, thermal sensor 416, memory 418, and timer 424 at a time. In another example, control logic 408 may enable timer 424 and one of the shift register 404, delay circuit 410, crack detector 414, thermal sensor 416, and memory 418. In one example, control logic 408 may enable or disable shift register 404, delay circuit 410, crack detector 414, thermal sensor 416, memory 418, and timer 424 based on data stored in configuration register 422. In one example, configuration register 422 is similar to configuration register 122 previously described and illustrated with reference to FIG. 1B. In another example, control logic 408 may enable or disable shift register 404, delay circuit 410, crack detector 414, thermal sensor 416, memory 418, and timer 424 based on data passed to integrated circuit 400, such as data passed to integrated circuit 400 through data interface 406.

Figure 5:
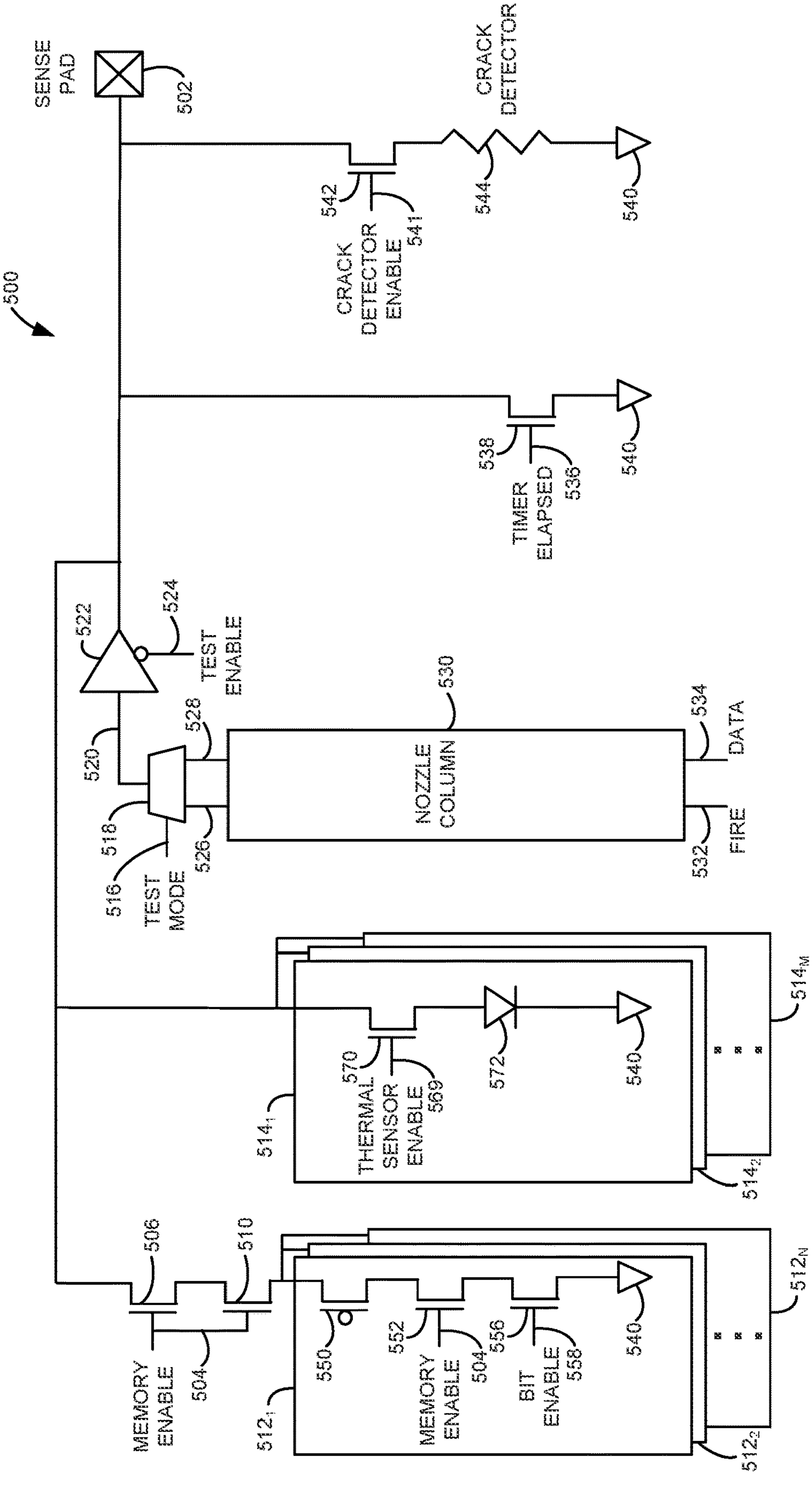
FIG. 5 is a schematic diagram illustrating one example of a circuit coupled to an interface.

FIG. 5 is a schematic diagram illustrating one example of a circuit 500 coupled to an interface (e.g., sense pad) 502. Circuit 500 includes a plurality of memory cells 512$_1$ to 512$_N$, where "N" is any suitable number of memory cells. Circuit 500 also includes a plurality of thermal sensors 514$_1$ to 514$_M$, where "M" is any suitable number of thermal sensors. In addition, circuit 500 includes transistors 506, 510, 538, and 542, a multiplexer 518, a tristate buffer 522, and a crack detector 544. Each memory cell 512$_1$ to 512$_N$ includes a floating gate transistor 550 and transistors 552 and 556. Each thermal sensor 514$_1$ to 514$_M$ includes a transistor 570 and a thermal diode 572.

Sense pad 502 is electrically coupled to one side of the source-drain path of transistor 506, one side of the source-drain path of the transistor 570 of each thermal sensor 514$_1$ to 514$_M$, the output of tristate buffer 522, one side of the source-drain path of transistor 538, and one side of the source-drain path of transistor 542. The other side of the source-drain path of transistor 506 is electrically coupled to one side of the source-drain path of transistor 510. The gate of transistor 506 and the gate of transistor 510 are electrically coupled to a memory enable signal path 504. The other side of the source drain path of transistor 510 is electrically coupled to one side of the source-drain path of the floating gate transistor 550 of each memory cell 512$_1$ to 512$_N$.

While memory cell 512$_1$ is illustrated and described herein, the other memory cells 512$_2$ to 512$_N$ include a similar circuit as memory cell 512$_1$. The other side of the source-drain path of floating gate transistor 550 is electrically coupled to one side of the source-drain path of transistor 552. The gate of transistor 552 is electrically coupled to a memory enable signal path 504. The other side of the source-drain path of transistor 552 is electrically coupled to one side of the source-drain path of transistor 556. The gate of transistor 556 is electrically coupled to a bit enable signal path 558. The other side of the source-drain path of transistor 556 is electrically coupled to a common or ground node 540.

While thermal sensor 514$_1$ is illustrated and described herein, the other thermal sensors 514$_2$ to 514$_M$ include a similar circuit as thermal sensor 514$_1$. The gate of transistor 570 is electrically coupled to a thermal sensor enable signal path 569. The other side of the source-drain path of transistor 570 is electrically coupled to the anode of thermal diode 572. The cathode of thermal diode 572 is electrically coupled to a common or ground node 540.

An enable input of tristate buffer 522 is electrically coupled to a test enable signal path 524. The input of tristate buffer 522 is electrically coupled to the output of multiplexer 518 through a signal path 520. A control input of multiplexer 518 is electrically coupled to a test mode signal path 516. A first input of multiplexer 518 is electrically coupled to nozzle column 530 through a signal path 526. A second input of multiplexer 518 is electrically coupled to nozzle column 530 through a signal path 528. Nozzle column 530 is electrically coupled to a fire interface 532 and a data interface 534.

The gate of transistor 538 is electrically coupled to a timer elapsed signal path 536. The other side of the source-drain path of transistor 538 is electrically coupled to a common or ground node 540. The gate of transistor 542 is electrically coupled to a crack detector enable signal path 541. The other side of the source-drain path of transistor 542 is electrically coupled to one side of crack detector 544. The other side of crack detector 544 is electrically coupled to a common or ground node 540.

The memory enable signal on memory enable signal path 504 determines whether a memory cell 512$_1$ to 512$_N$ may be accessed. In response to a logic high memory enable signal, transistors 506, 510, and 552 are turned on (i.e., conducting) to enable access to memory cells 512$_1$ to 512$_N$. In response to a logic low memory enable signal, transistors 506, 510, and 552 are turned off to disable access to memory cells 512$_1$ to 512$_N$. With a logic high memory enable signal, a bit enable signal may be activated to access a selected memory cell 512$_1$ to 512$_N$. With a logic high bit enable signal, transistor 556 is turned on to access the corresponding memory cell. With a logic low bit enable signal, transistor 556 is turned off to block access to the corresponding memory cell. With a logic high memory enable signal and a logic high bit enable signal, the floating gate transistor 550 of the corresponding memory cell may be accessed for read and write operations through sense pad 502. In one example, the memory enable signal may be based on a data bit stored in a configuration register, such as configuration register 422 of FIG. 4. In another example, the memory enable signal may be based on data passed to circuit 500 from a fluid ejection system, such as fluid ejection system 700 to be described below with reference to FIG. 7.

Each thermal sensor $514_1$ to $514_M$ may be enabled or disabled via a corresponding thermal sensor enable signal on thermal sensor enable signal path 569. In response to a logic high thermal sensor enable signal, the transistor 570 for the corresponding thermal sensor $514_1$ to $514_M$ is turned on to enable the thermal sensor by electrically connecting thermal diode 572 to sense pad 502. In response to a logic low thermal sensor enable signal, the transistor 570 for the corresponding thermal sensor $514_1$ to $514_M$ is turned off to disable the thermal sensor by electrically disconnecting thermal diode 572 from sense pad 502. With a thermal sensor enabled, the thermal sensor may be read through sense pad 502, such as by applying a current to sense pad 502 and sensing a voltage on sense pad 502 indicative of the temperature. In one example, the thermal sensor enable signal may be based on data stored in a configuration register, such as configuration register 422 of FIG. 4. In another example, the thermal sensor enable signal may be based on data passed to circuit 500 from a fluid ejection system.

Tristate buffer 522 may be enabled or disabled in response to the test enable signal on test enable signal path 524. In response to a logic high test enable signal, tristate buffer 522 is enabled to pass signals from signal path 520 to sense pad 502. In response to a logic low test enable signal, tristate buffer 522 is disabled and outputs a high impedance signal to sense pad 502. Nozzle column 530 may include a shift register and a delay circuit used to fire fluid actuation devices. The test mode signal on test mode signal path 516 determines whether the shift register or the delay circuit of the nozzle column 530 is to be tested and controls the multiplexer 518 accordingly. To test the shift register of nozzle column 530, data is passed to nozzle column 530 through data interface 534 and shifted out of the shift register to signal path 528 and through multiplexer 518 and tristate buffer 522 to sense pad 502. To test the delay circuit of nozzle column 530, a fire signal on fire interface 532 is passed to nozzle column 530. After passing through the delay circuit, the delayed fire signal is passed to signal path 526 and through multiplexer 518 and tristate buffer 522 to sense pad 502. In one example, the test enable signal and the test mode signal may be based on data stored in a configuration register, such as configuration register 422 of FIG. 4. In another example, the test enable signal and the test mode signal may be based on data passed to circuit 500 from a fluid ejection system.

Transistor 538 may provide a pulldown device, which is enabled in response to a timer elapsed signal on timer elapsed signal path 536. The timer elapsed signal is provided by a timer, such as timer 424 of FIG. 4. In response to a logic low timer elapsed signal, transistor 538 is turned off. In response to a logic high timer elapsed signal, transistor 538 is turned on to pull the signal on contact pad 502 to the voltage of the common or ground node 540. In one example, the timer that generates the timer elapsed signal may be enabled or disabled based on data stored in a configuration register, such as configuration register 422 of FIG. 4. In another example, the timer that generates the timer elapsed signal may be enabled or disabled based on data passed to circuit 500 from a fluid ejection system.

Crack detector 544 may be enabled or disabled in response to the crack detector enable signal on crack detector enable signal path 541. In response to a logic high crack detector enable signal, the transistor 542 is turned on to enable crack detector 544 by electrically connecting crack detector 544 to sense pad 502. In response to a logic low crack detector enable signal, the transistor 542 is turned off to disable the crack detector 544 by electrically disconnecting crack detector 544 from sense pad 502. With crack detector 544 enabled, the crack detector 544 may be read through sense pad 502, such as by applying a current or voltage to sense pad 502 and sensing a voltage or current, respectively, on sense pad 502 indicative of the state of crack detector 544. In one example, the crack detector enable signal may be based on data stored in a configuration register, such as configuration register 422 of FIG. 4. In another example, the crack detector enable signal may be based on data passed to circuit 500 from a fluid ejection system.

The fire interface 532 and the data interface 534 may each include a contact pad, a pin, a bump, or a wire. In one example, each of the fire interface 532, the data interface 534, and the sense pad 502 is configured to contact a corresponding printer-side contact to transmit signals to and from the printer-side contacts. Accordingly, through a single sense pad 502, a printer may be connected to memory cells $512_1$ to $512_N$, thermal sensors $514_1$ to $514_M$, nozzle column 530, pulldown device 538, and crack detector 544.

Figure 6A:
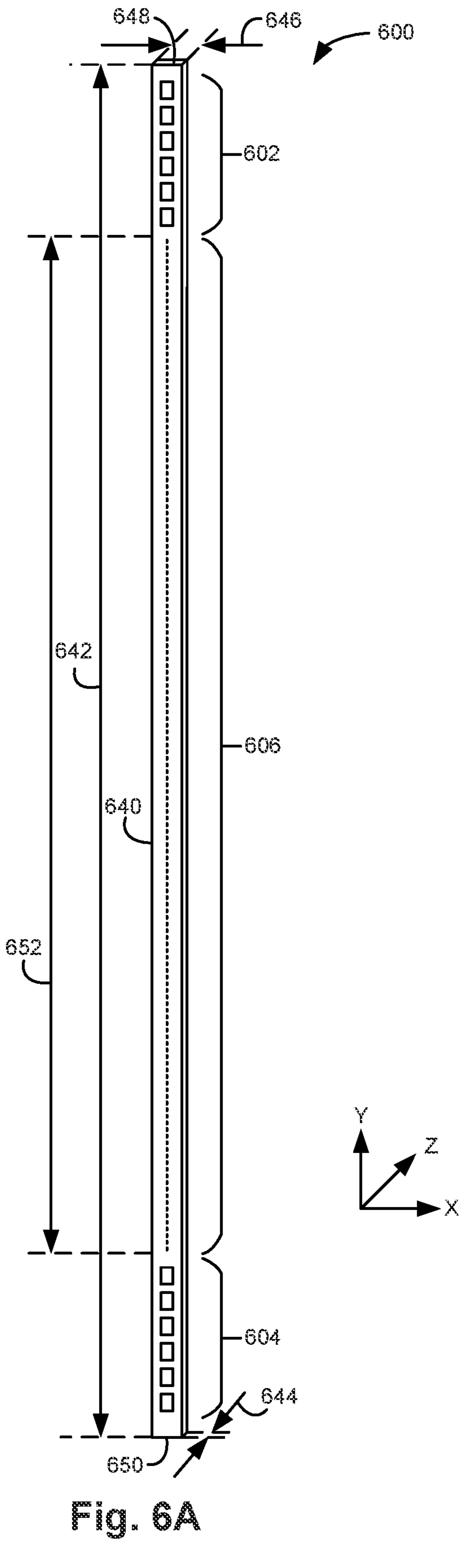
FIGS. 6A and 6B illustrate one example of a fluid ejection die.
Figure 6B:
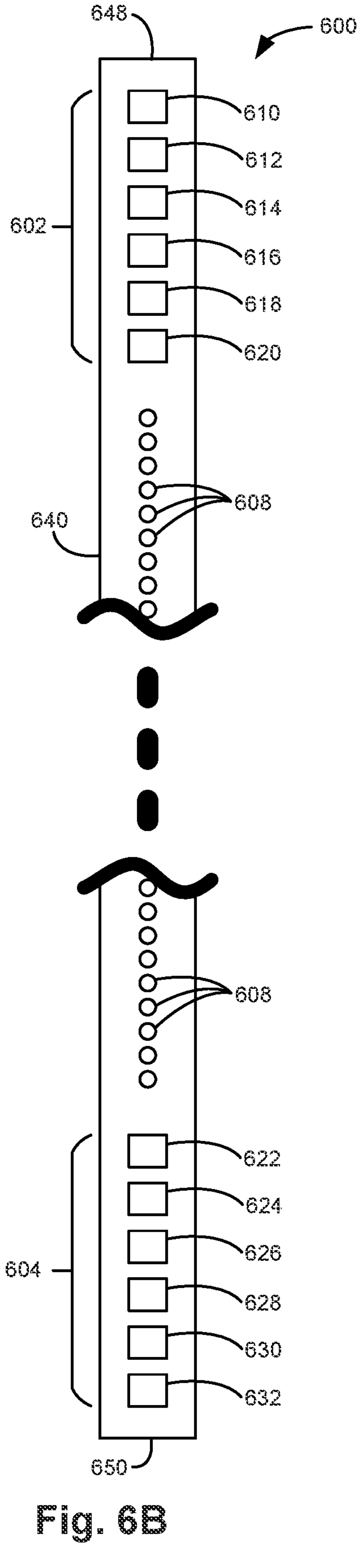

FIG. 6A illustrates one example of a fluid ejection die 600 and FIG. 6B illustrates an enlarged view of the ends of fluid ejection die 600. In one example, fluid ejection die 600 includes integrated circuit 100 of FIG. 1A, integrated circuit 120 of FIG. 1B, integrated circuit 200 of FIG. 2A, integrated circuit 220 of FIG. 2B, integrated circuit 300 of FIG. 3A, integrated circuit 320 of FIG. 3B, integrated circuit 400 of FIG. 4, or circuit 500 of FIG. 5. Die 600 includes a first column 602 of contact pads, a second column 604 of contact pads, and a column 606 of fluid actuation devices 608.

The second column 604 of contact pads is aligned with the first column 602 of contact pads and at a distance (i.e., along the Y axis) from the first column 602 of contact pads. The column 606 of fluid actuation devices 608 is disposed longitudinally to the first column 602 of contact pads and the second column 604 of contact pads. The column 606 of fluid actuation devices 608 is also arranged between the first column 602 of contact pads and the second column 604 of contact pads. In one example, fluid actuation devices 608 are nozzles or fluidic pumps to eject fluid drops.

In one example, the first column 602 of contact pads includes six contact pads. The first column 602 of contact pads may include the following contact pads in order: a data contact pad 610, a clock contact pad 612, a logic power ground return contact pad 614, a multipurpose input/output contact (e.g., sense) pad 616, a first high voltage power supply contact pad 618, and a first high voltage power ground return contact pad 620. Therefore, the first column 602 of contact pads includes the data contact pad 610 at the top of the first column 602, the first high voltage power ground return contact pad 620 at the bottom of the first column 602, and the first high voltage power supply contact pad 618 directly above the first high voltage power ground return contact pad 620. While contact pads 610, 612, 614, 616, 618, and 620 are illustrated in a particular order, in other examples the contact pads may be arranged in a different order.

In one example, the second column 604 of contact pads includes six contact pads. The second column 604 of contact pads may include the following contact pads in order: a second high voltage power ground return contact pad 622, a second high voltage power supply contact pad 624, a logic reset contact pad 626, a logic power supply contact pad 628, a mode contact pad 630, and a fire contact pad 632. Therefore, the second column 604 of contact pads includes the second high voltage power ground return contact pad 622 at the top of the second column 604, the second high voltage power supply contact pad 624 directly below the second high voltage power ground return contact pad 622, and the fire contact pad 632 at the bottom of the second column 604. While contact pads 622, 624, 626, 628, 630, and 632 are illustrated in a particular order, in other examples the contact pads may be arranged in a different order.

In one example, data contact pad 610 may provide data interface 306 of FIG. 3A or 3B, data interface 406 of FIG. 4, or data interface 534 of FIG. 5. Multipurpose input/output contact (e.g., sense) pad 616 may provide sense interface 102 of FIG. 1A or 1B, sense interface 202 of FIG. 2A or 2B, sense interface 302 of FIG. 3A or 3B, sense interface 402 of FIG. 4, or sense pad 502 of FIG. 5. Fire contact pad 632 may provide fire interface 312 of FIG. 3B, fire interface 412 of FIG. 4, or fire interface 532 of FIG. 5.

Data contact pad 610 may be used to input serial data to die 600 for selecting fluid actuation devices, memory bits, thermal sensors, configuration modes (e.g. via a configuration register), etc. Data contact pad 610 may also be used to output serial data from die 600 for reading memory bits, configuration modes, status information (e.g., via a status register), etc. Clock contact pad 612 may be used to input a clock signal to die 600 to shift serial data on data contact pad 610 into the die or to shift serial data out of the die to data contact pad 610. Logic power ground return contact pad 614 provides a ground return path for logic power (e.g., about 0 V) supplied to die 600. In one example, logic power ground return contact pad 614 is electrically coupled to the semiconductor (e.g., silicon) substrate 640 of die 600. Multipurpose input/output contact pad 616 may be used for analog sensing and/or digital test modes of die 600.

First high voltage power supply contact pad 618 and second high voltage power supply contact pad 624 may be used to supply high voltage (e.g., about 32 V) to die 600. First high voltage power ground return contact pad 620 and second high voltage power ground return contact pad 622 may be used to provide a power ground return (e.g., about 0 V) for the high voltage power supply. The high voltage power ground return contact pads 620 and 622 are not directly electrically connected to the semiconductor substrate 640 of die 600. The specific contact pad order with the high voltage power supply contact pads 618 and 624 and the high voltage power ground return contact pads 620 and 622 as the innermost contact pads may improve power delivery to die 600. Having the high voltage power ground return contact pads 620 and 622 at the bottom of the first column 602 and at the top of the second column 604, respectively, may improve reliability for manufacturing and may improve ink shorts protection.

Logic reset contact pad 626 may be used as a logic reset input to control the operating state of die 600. Logic power supply contact pad 628 may be used to supply logic power (e.g., between about 1.8 V and 15 V, such as 5.6 V) to die 600. Mode contact pad 630 may be used as a logic input to control access to enable/disable configuration modes (i.e., functional modes) of die 600. Fire contact pad 632 may be used as a logic input to latch loaded data from data contact pad 610 and to enable fluid actuation devices or memory elements of die 600.

Die 600 includes an elongate substrate 640 having a length 642 (along the Y axis), a thickness 644 (along the Z axis), and a width 646 (along the X axis). In one example, the length 642 is at least twenty times the width 646. The width 646 may be 1 mm or less and the thickness 644 may be less than 500 microns. The fluid actuation devices 608 (e.g., fluid actuation logic) and contact pads 610-632 are provided on the elongate substrate 640 and are arranged along the length 642 of the elongate substrate. Fluid actuation devices 608 have a swath length 652 less than the length 642 of the elongate substrate 640. In one example, the swath length 652 is at least 1.2 cm. The contact pads 610-632 may be electrically coupled to the fluid actuation logic. The first column 602 of contact pads may be arranged near a first longitudinal end 648 of the elongate substrate 640. The second column 604 of contact pads may be arranged near a second longitudinal end 650 of the elongate substrate 640 opposite to the first longitudinal end 648.

Figure 7:
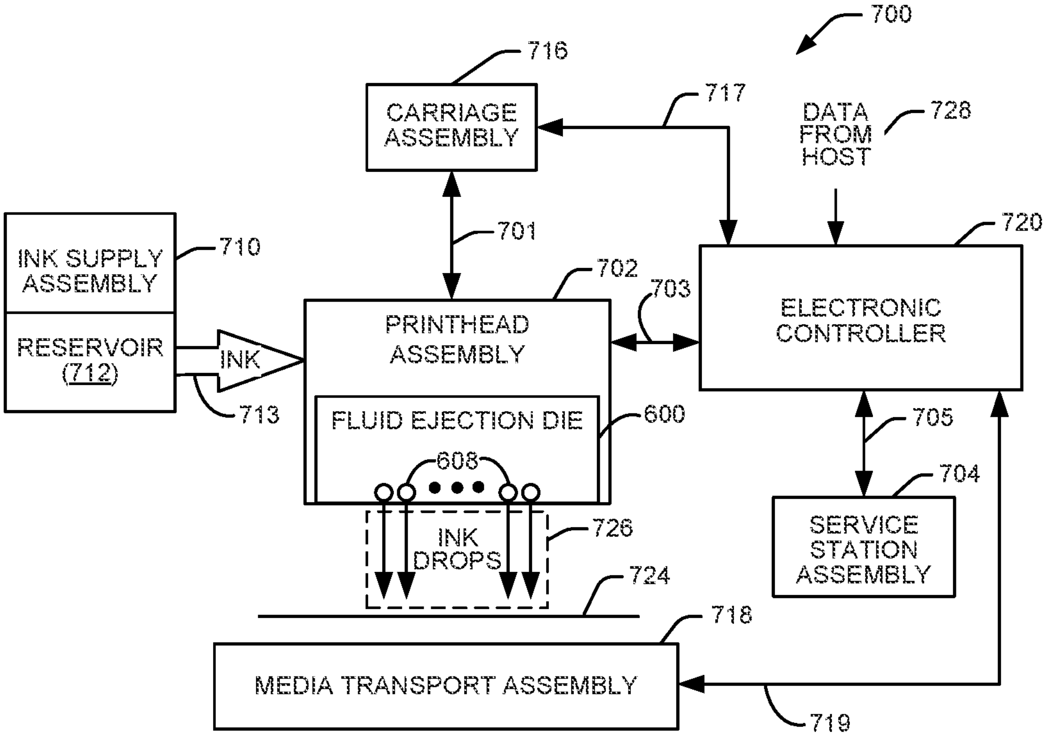
FIG. 7 is a block diagram illustrating one example of a fluid ejection system.

FIG. 7 is a block diagram illustrating one example of a fluid ejection system 700. Fluid ejection system 700 includes a fluid ejection assembly, such as printhead assembly 702, and a fluid supply assembly, such as ink supply assembly 710. In the illustrated example, fluid ejection system 700 also includes a service station assembly 704, a carriage assembly 716, a print media transport assembly 718, and an electronic controller 720. While the following description provides examples of systems and assemblies for fluid handling with regard to ink, the disclosed systems and assemblies are also applicable to the handling of fluids other than ink.

Printhead assembly 702 includes at least one printhead or fluid ejection die 600 previously described and illustrated with reference to FIGS. 6A and 6B, which ejects drops of ink or fluid through a plurality of orifices or nozzles 608. In one example, the drops are directed toward a medium, such as print media 724, so as to print onto print media 724. In one example, print media 724 includes any type of suitable sheet material, such as paper, card stock, transparencies, Mylar, fabric, and the like. In another example, print media 724 includes media for three-dimensional (3D) printing, such as a powder bed, or media for bioprinting and/or drug discovery testing, such as a reservoir or container. In one example, nozzles 608 are arranged in at least one column or array such that properly sequenced ejection of ink from nozzles 608 causes characters, symbols, and/or other graphics or images to be printed upon print media 724 as printhead assembly 702 and print media 724 are moved relative to each other.

Ink supply assembly 710 supplies ink to printhead assembly 702 and includes a reservoir 712 for storing ink. As such, in one example, ink flows from reservoir 712 to printhead assembly 702. In one example, printhead assembly 702 and ink supply assembly 710 are housed together in an inkjet or fluid-jet print cartridge or pen. In another example, ink supply assembly 710 is separate from printhead assembly 702 and supplies ink to printhead assembly 702 through an interface connection 713, such as a supply tube and/or valve.

Carriage assembly 716 positions printhead assembly 702 relative to print media transport assembly 718, and print media transport assembly 718 positions print media 724 relative to printhead assembly 702. Thus, a print zone 726 is defined adjacent to nozzles 608 in an area between printhead assembly 702 and print media 724. In one example, printhead assembly 702 is a scanning type printhead assembly such that carriage assembly 716 moves printhead assembly 702 relative to print media transport assembly 718. In another example, printhead assembly 702 is a non-scanning type printhead assembly such that carriage assembly 716 fixes printhead assembly 702 at a prescribed position relative to print media transport assembly 718.

Service station assembly 704 provides for spitting, wiping, capping, and/or priming of printhead assembly 702 to maintain the functionality of printhead assembly 702 and, more specifically, nozzles 608. For example, service station assembly 704 may include a rubber blade or wiper which is periodically passed over printhead assembly 702 to wipe and clean nozzles 608 of excess ink. In addition, service station assembly 704 may include a cap that covers printhead assembly 702 to protect nozzles 608 from drying out during periods of non-use. In addition, service station assembly 704 may include a spittoon into which printhead assembly 702 ejects ink during spits to ensure that reservoir 712 maintains an appropriate level of pressure and fluidity, and to ensure that nozzles 608 do not clog or weep. Functions of service station assembly 704 may include relative motion between service station assembly 704 and printhead assembly 702.

Electronic controller 720 communicates with printhead assembly 702 through a communication path 703, service station assembly 704 through a communication path 705, carriage assembly 716 through a communication path 717, and print media transport assembly 718 through a communication path 719. In one example, when printhead assembly 702 is mounted in carriage assembly 716, electronic controller 720 and printhead assembly 702 may communicate via carriage assembly 716 through a communication path 701. Electronic controller 720 may also communicate with ink supply assembly 710 such that, in one implementation, a new (or used) ink supply may be detected.

Electronic controller 720 receives data 728 from a host system, such as a computer, and may include memory for temporarily storing data 728. Data 728 may be sent to fluid ejection system 700 along an electronic, infrared, optical or other information transfer path. Data 728 represent, for example, a document and/or file to be printed. As such, data 728 form a print job for fluid ejection system 700 and includes at least one print job command and/or command parameter.

In one example, electronic controller 720 provides control of printhead assembly 702 including timing control for ejection of ink drops from nozzles 608. As such, electronic controller 720 defines a pattern of ejected ink drops which form characters, symbols, and/or other graphics or images on print media 724. Timing control and, therefore, the pattern of ejected ink drops, is determined by the print job commands and/or command parameters. In one example, logic and drive circuitry forming a portion of electronic controller 720 is located on printhead assembly 702. In another example, logic and drive circuitry forming a portion of electronic controller 720 is located off printhead assembly 702.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An integrated circuit for a fluid ejection device, the integrated circuit comprising:

an interface including a pad, the interface to selectively couple the pad with a memory cell and to selectively couple the pad with a thermal sensor;

an analog circuit to output an analog signal to the interface; and a timer to override the analog signal on the interface from the analog circuit in response to the timer elapsing.

2. The integrated circuit of claim 1, further comprising:

a pulldown device coupled to the interface, wherein the timer overrides the analog signal on the interface from the analog circuit by activating the pulldown device.

3. The integrated circuit of claim 1, wherein the analog circuit comprises a crack detector.

4. The integrated circuit of claim 1, wherein the analog circuit comprises the thermal sensor.

5. The integrated circuit of claim 1, wherein the analog circuit is to output an analog signal representative of a state of the integrated circuit, the state comprising at least one of a crack and a temperature.

6. The integrated circuit of claim 1, further comprising:

a configuration register to enable or disable the analog circuit and to enable or disable the timer.

7. The integrated circuit of claim 1, further comprising:

a digital circuit to output a digital signal to the interface, and control logic to activate the digital circuit or the analog circuit, wherein the timer is to override the analog signal on the interface from the analog circuit or the digital signal on the interface from the digital circuit in response to the timer elapsing.

8. The integrated circuit of claim 7, wherein the digital circuit comprises the memory cell.

9. The integrated circuit of claim 7, wherein the digital circuit comprises a configuration register.

10. The integrated circuit of claim 7, wherein the digital circuit comprises a shift register.

11. The integrated circuit of claim 7, further comprising:

a configuration register to enable or disable the digital circuit.

12. The integrated circuit of claim 1, wherein the interface comprises a single contact pad, a single pin, a single bump, or a single wire.

13. The integrated circuit of claim 1, wherein the interface is to contact a single printer-side contact to transmit signals to and from the single printer-side contact.

* * * * *